T866025

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 30, 1969

866 O.G. 1437

753,705

DUAL PRIMER COATING PROCESS

Werner S. Zimmt, Wynnewood, Pa., assignor to E. I. du Pont de Nemours and Company, Wilmington, Del., a corporation of Delaware

Continuation-in-part of application Ser. No. 383,242, July 16, 1964. This application Aug. 19, 1968. Published Sept. 30, 1969

Int. Cl. B44d *1/34, 1/14, 1/22*

U.S. Cl. 117—75

No Drawing. 24 Pages Specification

A process for applying a primer to metal or a glass fiber reinforced plastic substrate in which a highly pigmented subcoat having a pigment volume concentration of about 50–90% is applied to the substrate and is then shaped, for example, by sanding; a second primer coat which has a pigment volume concentration of about 0–20% is applied over the highly pigmented subcoat to seal the pigmented subcoat to the substrate. Any conventional vehicle which forms durable coatings and adheres to metal or plastic substrates can be used in this invention. Such vehicles include alkyd resins, epoxy resins, vinyl cyclic acetal resins, acrylic resins, polyurethane resins, hydrofluorocarbon resins, cellulose esters, resins of diisocyanate reaction products, vinyl resins and a variety of polyester resins. The pigments used in the dual primer composition can be any of the types well known in the coating art such as metal oxide pigments, lead and zinc chromates and metallic pigments. Extender pigments can be included with the metal oxide pigment.